United States Patent [19]

Rosenberg

[11] Patent Number: 4,678,004

[45] Date of Patent: Jul. 7, 1987

[54] QUICK-ACTION ON/OFF VALVE

[76] Inventor: Peretz Rosenberg, Moshav Beit Shearim, Israel

[21] Appl. No.: 746,863

[22] Filed: Jun. 20, 1985

[30] Foreign Application Priority Data

Jul. 6, 1984 [IL] Israel .................................. 72316

[51] Int. Cl.$^4$ .............................................. F16K 17/30
[52] U.S. Cl. ..................... 137/469; 137/536; 137/538; 137/540
[58] Field of Search ............... 137/536, 538, 470, 219, 137/539.5, 469, 540

[56] References Cited

U.S. PATENT DOCUMENTS

| 2,239,169 | 4/1941 | Franck | 137/536 |
| 2,415,258 | 2/1947 | Parker et al. | 137/536 |
| 3,943,969 | 3/1976 | Rubin et al. | 137/538 |
| 4,226,261 | 10/1980 | Ekeleme et al. | 137/469 |
| 4,474,207 | 10/1984 | Rosenberg | 137/220 |

Primary Examiner—Alan Cohan
Assistant Examiner—John A. Rivell
Attorney, Agent, or Firm—Benjamin J. Barish

[57] ABSTRACT

A quick-action on/off valve comprises a housing including a partition having an interconnecting passageway between the two chambers on opposite sides of the partition. One chamber includes a fixed piston and a movable cylinder, the cylinder including a resilient disc between its closed end and the port leading from the first chamber, and a spring urging the cylinder in the direction tending to close the latter port. Spacing means are provided between the partition and the open end of the cylinder for continuously maintaining communication between the first chamber and the interconnecting passageway. The difference in the cross-sectional areas of the first port and of the cylinder result in a smaller area of the cylinder being effective to open the valve when the valve is closed, but a larger area of the cylinder being effective to close the valve when the valve is open, thereby providing a quick-action opening and closing of the valve.

14 Claims, 6 Drawing Figures

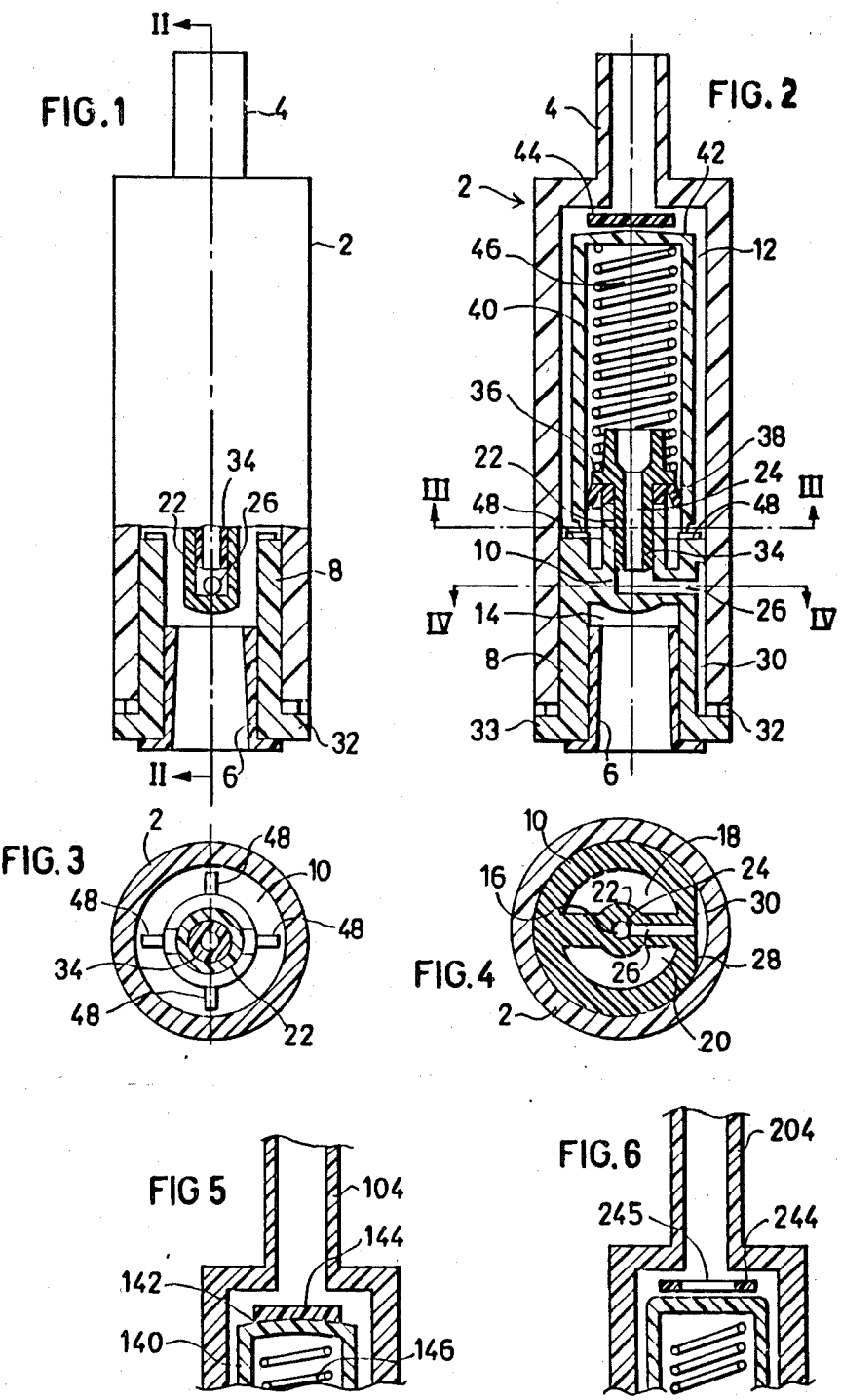

QUICK-ACTION ON/OFF VALVE

BACKGROUND OF THE INVENTION

The present invention relates to a quick-action on/off valve. More particularly, the invention relates to a valve which effects a quick-action opening of the line when the line pressure reaches a predetermined minimum, and effects a quick-action closing of the line when the line pressure drops below a predetermined minimum.

There are many applications wherein it is desirable to provide a valve which maintains the line closed until the line pressure rises above a predetermined minimum value, at which time the valve is to open with a quick-action; such valve is also to maintain the line open unless and until the line pressure drops below another predetermined value, lower than the predetermined opening pressure, at which time the value is to close with a quick-action. One application for such a valve is in systems for supplying irrigating water to rotary sprinklers, wherein the sprinklers require a minimum line pressure in order to produce proper operation, i.e. rotation of the sprinkler, minimum range of distribution of the water, and the like; thus, if the supply line is turned on when the line pressure is too low, the sprinklers will receive a supply of water but will not properly operate to distribute the water, thereby producing water wastage. Another application for such valves is in pulsating water supply systems, for example in greenhouse cooling, wherein proper operation of the system requires quick-action opening and closing of the line to produce each pulse of water.

An object of the present invention is to provide an on/off valve having advantages in the above respects and particularly useful in the above-mentioned applications as well as in other applications wherein quick-action opening and closing of the valve is required or desired.

BRIEF SUMMARY OF THE INVENTION

According to a broad aspect of the present invention, there is provided an on/off valve for controlling the flow of a fluid between an inlet line and an outlet line to which the valve is to be connected, comprising: a housing including a partition dividing its interior into a first chamber, a second chamber, and an interconnecting passageway; a first port connectable to one of the lines and communicating with the first chamber; a second port connectable to the other of the lines and communicating with the second chamber; a piston fixed in the first chamber; and a cylinder disposed in the first chamber and movable with respect to the piston. The cylinder includes a closed end facing the first port and of substantially larger cross-sectional area than the first port, the space between the piston and cylinder being vented to the atmosphere. A resilient disc is interposed between the first port and the closed end of the cylinder. The opposite end of the cylinder is open and faces the partition. The valve further includes spacing means cooperable with the partition and the open end of the cylinder for continuously maintaining communication between the first chamber and the interconnecting passageway; and a spring interposed between the fixed piston and the movable cylinder urging the cylinder in the direction tending to close the first port.

As will be described more particularly below, the foregoing arrangement, particularly the difference in the cross-sectional areas of the first port and of the cylinder cooperable therewith, results in a small area of the cylinder being effective to open the valve, when the valve is closed, but a larger area of the cylinder being effective to close the valve when the valve is open, thereby providing a quick-action opening and closing of the valve.

In one described embodiment, this resilient a disc is of smaller diameter than the first port, and is freely movable with respect to the cylinder closed end for closing the first port; in this embodiment, the first port constitutes an inlet port and is connectable to the inlet line.

However, further embodiments are described wherein either of the two ports may constitute the inlet port. This may be effective, as more particularly described below, by securing the disc to the cylinder closed end, or by making the disc of annular configuration.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a side elevational view, partly broken away, illustrating one form of on/off valve constructed in accordance with the present invention;

FIG. 2 is a longitudinal sectional view along line of II—II of of FIG. 1;

FIGS. 3 and 4 are cross-sectional views along lines III—III and IV—IV, respectively, of FIG. 2; and FIGS. 5 and 6 are fragmentary views illustrating modifications in the valve of FIGS. 1–4.

DESCRIPTION OF PREFERRED EMBODIMENTS

The on/off valve illustrated in the drawings is of very similar construction to the regulator valve illustrated in my prior U.S. Pat. No. 4,474,207 but includes several modifications, as will be described more particularly below, to provide quick-action opening and closing, rather than regulation, of the water supply. An advantage of the illustrated construction, therefore, is that by a slight modification of the design, the regulator of that patent specification can be converted to an on/off valve according to the present invention, thereby substantially decreasing the initial tooling costs, and the inventory of parts needed for repair and maintenance purposes.

The on/off valve illustrated in the drawings is in the form of an in-line fitting, adapted to be connected between the inlet and outlet lines (not shown). Such a valve is particularly useful wherein the line supplies water to irrigation devices, such as rotary sprinklers, and the valve is to prevent their operation until the line pressure rises above a predetermined minimum; the valve is effective then to provide quick-action opening of the line, and also to provide quick-action closing of the line should the pressure again drop below a predetermined minimum. Another application, mentioned earlier, is in pulsators, e.g. such as are used for cooling greenhouses.

The on/off valve illustrated in FIGS. 1–4 comprises a cylindrical housing 2 formed at one end with a reduced diameter extension 4 defining a port connectable, e.g., to the inlet line, and having at its opposite end a collar 6 defining another port, e.g., connectable to the outlet line. Collar 6 is frictionally received within a sleeve 8 which sleeve is in turn frictionally received within the respective end of housing 2.

Sleeve 8 is integrally formed with an annular ring or partition 10 defining, on opposite sides, a first chamber 12 communicating with the inlet extension 4, and a second chamber 14 communicating with the outlet collar 6. As shown particularly in FIG. 4, annular ring 10 includes a diametrically-extending web 16 defining two openings 18, 20 serving as an interconnecting passageway connecting the inlet chamber 12 to the outlet chamber 14. Annular ring 10 is further formed with an upstanding stem 22 having a vertical bore 24 communicating at its lower end with a horizontal bore 26 formed through one-half of the web 16 and extending to the outer face of sleeve 8. That outer face of the sleeve is flattened on one side, as shown at 28 in FIG. 4, to define a venting passageway 30 between it and housing 2. This passageway communicates with the atmosphere via the spaces between a plurality of ribs 32 formed at the end of housing 2 engageable with a flange 33 formed at the lower end of sleeve 8.

Stem 22 receives a sleeve 34 formed at its upper end with an annular shoulder 36 carrying a sealing ring 38 on its lower face, i.e. on the side facing the annular ring 10. Annular flange 36, together with its sealing ring 38, constitutes a piston cooperable with a cylinder 40 having its open end received over the sealing ring, and its opposite end closed by an end wall 42 adjacent to the inlet extension 4. A resilient disc 44, of rubber or the like, is interposed between the cylinder end wall 42 and the inlet extension 4. In addition, a coiled spring 46 is interposed between the innerface of cylinder end wall 42 and the face of annular shoulder 36 opposite to that carrying the sealing ring 38.

As shown in FIG. 3, the upper surface of annular ring 10, i.e. the surface facing the open end of cylinder 4, is formed with a plurality of circumferentially-spaced ribs or abutments 48 engageable with the open end of cylinder 40 so as to continuously maintain communication between the inlet chamber 12 and the outlet chamber 14 via passageways 18 and 20 through the annular ring 10.

The valve illustrated in FIGS. 1-4 operates as follows:

As noted above annular shoulder 36, together with its sealing ring 38, defines a piston fixed within housing 2, which piston is cooperable with cylinder 40. Cylinder 40 is biased by spring 46 in the direction tending to cause its end wall 42 to press the resilient disc 4 against the inlet opening defined by housing extension 4. The outer diameter of resilient disc 44 is slightly larger than the diameter of the inlet bore defined by extension 4, but is slightly smaller than the outer diameter of cylinder 40. As one example, the inner diameter of the inlet bore may be 4 mm, the outer diameter of disc 44 may be 5 mm, and the outer diameter of cylinder 40 may be 8 mm.

Thus, when the valve is connected between the inlet and outlet lines, the force of spring 46 biases cylinder 40 to close the inlet extension 4, until the inlet pressure reaches a predetermined value sufficient, by the force applied by it to disc 44, to overcome the force of spring 46. The force applied by the inlet pressure to disc 44 is related to the cross-sectional area of the inlet bore, which in our described example is 4 mm. As soon as the inlet pressure reaches a value such that it, when multiplied by the cross-sectional area of the inlet bore 4, overcomes the force of spring 46, this inlet pressure moves disc 44 together with cylinder 40, away from the mouth of the inlet bore 4; and as soon as this occurs, the effective area is then immediately increased to that of the cross-sectional area of cylinder 44 (the latter cylinder having a diameter of 8 mm in this example), to produce a very quick-action opening of the inlet port 4.

During this opening movement of cylinder 40, abutments 48 in annular ring 10 engage the open end of cylinder 40 and keep it spaced from the annular ring, thereby continuously maintaining communication through the spaces between the abutments and through passageways 18 and 20 to the outlet chamber 14, such that there is a continuous flow of water from inlet extension 4 through the outlet collar 6. The venting of the interior of cylinder 40 to the atmosphere via bores 24 and 26, space 30 and the space between ribs 32, permits this displacement of the cylinder when the inlet pressure has risen to the predetermined minimum for opening the valve.

Thus, when the valve is in its open position, pressurized water flows from the inlet 4 through the spaces between abutments 48 and the open end of cylinder 40, passageways 18 and 20, and through the outlet 6, to supply pressurized water to the sprinklers or other devices connected to the outlet line.

During this normal open condition of the valve, the inlet pressure is applied to the enlarged cross-sectional area of the cylinder 4 to maintain the valve in its open condition. However, if the inlet pressure should drop below another predetermined value, lower than the predetermined opening pressure because the effective surface area has now been enlarged so as to be the total cross-sectional area of cylinder 40, spring 46 will move that cylinder 40 and its disc 44 back against the mouth of the inlet bore 4 to close same; and as soon as this occurs the effective area is now reduced to that of the inlet bore 4, thereby providing a quick-action closing of the inlet bore.

It will be appreciated that the valve illustrated in FIGS. 1-4 can be used for only one-way operation, i.e., wherein its extension 4 is connectable to the inlet line, and its collar 6 at the opposite end is connected to the outlet line. Thus, if the connections were reversed so that collar 6 was connected to the inlet line and extension 4 was connected to the outlet line, cylinder end wall 42 would be moved away from port 4 when the opening force (in this case, the inlet pressure multiplied by the difference in cross-sectional area between that of cylinder 40 and port 4) was sufficient to overcome spring 46, but the flow of the water out through port 4 would tend to move disc 44 to close this port.

However, with a slight modification, as shown in FIGS. 5 or 6, the valve may be adapted to two-way operation, permitting either end to be used as the inlet port.

FIG. 5 illustrates one way of doing this, by securing the disc, therein designated 144, to the end wall 142 of the cylinder 140, so that the disc cannot separate from the cylinder. Thus, when the collar end 6 is used as the inlet port, the opening force would depend on the difference in cross-sectional area between that of the cylinder 140 and port 104 (now serving as the outlet port); and when the force so applied to the cylinder was sufficient to overcome the internal spring 146, the outlet port 104 would open. As soon as this occurs, the full cross-sectional area of cylinder 140 would then be effective to retain the cylinder in the valve-opening condition, thereby producing a quick-action opening of the valve. In addition, the inlet pressure would have to drop considerably less than the minimum opening inlet pressure before the valve closed. Thus, the effective area when the valve is open is the complete cross-sectional area of the cylinder, but as soon as the inlet pressure drops to this minimum value for closing the valve, the effective are acting on the spring immediately drops to the difference between the cross-sectional are of cylinder 140 and port 104, thereby producing a quick-action closing of the valve.

FIG. 6 illustrates that the same results may be produced by forming the disc, therein designated 244, of annular shape, having an opening 245 at least as large, and preferably slightly larger, than the diameter of port 204. In such an arrangement, the same action occurs for opening and closing the valve when the connections are reversed as described above with respect to FIG. 5.

Many other variations, modifications and applications of the invention will be apparent.

I claim:

1. An on/off valve for controlling the flow of a fluid between an inlet line and an outlet line to which said valve is to be connected, comprising:
   a housing including a partition dividing its interior into a first chamber, a second chamber, and an interconnecting passageway;
   a first port connectable to one of said lines and communicating with said first chamber;
   a second port connectable to the other of said lines and communicating with said second chamber;
   a piston fixed in said first chamber;
   a cylinder disposed in said first chamber and movable with respect to said piston fixed in said first chamber;
   said cylinder including a closed end facing said first port and of substantially larger cross-sectional area than said first port;
   the space between said piston and cylinder being vented to the atmosphere;
   a resilient disc interposed between said first port and said closed end of the cylinder;
   the opposite end of the cylinder being opened and facing said partition;
   spacing means cooperable with said partition and said open end of the cylinder for continuously maintaining communication between said first chamber and said interconnecting passageway;
   and a spring interposed between said fixed piston and said movable cylinder urging the cylinder in the direction tending to close said first port.

2. The valve according to claim 1, wherein said resilient disc is of smaller diameter than said first port and is freely movable with respect thereto and said cylinder closed end for closing said first port, said first port constituting an inlet port and being connectable to the inlet line.

3. The valve according to claim 1, wherein said resilient disc is of smaller diameter than said first port and is secured to said closed cylinder end for closing said first port, said first port constituting either an inlet port connectable to the inlet line, or an outlet port connectable to the outlet line.

4. The valve according to claim 1, wherein said resilient disc is of annular shape having a smaller outer diameter than said first port and is freely movable with respect thereto and said cylinder closed end for closing said first port, said first port thereby constituting an inlet port connectable to the inlet line, or an outlet line connectable to the outlet line.

5. The valve according to claim 1, wherein said partition comprises an annular ring secured within said housing, and said spacing means comprises a plurality of abutments spaced circumferentially around said annular ring and engageable with the open end of said cylinder for maintaining same spaced from the annular ring and thereby continously maintaining open said interconnecting passageway and the two chambers.

6. The valve according to claim 1, wherein the space between the piston and cylinder is vented to the atmosphere via a bore formed through the piston and the housing partition to the atmosphere.

7. A valve according to claim 1, wherein said piston includes a sleeve inserted into the housing and formed with a flat outer face defining a space between it and the inner face of the housing, the space between the piston and cylinder being vented to the atmosphere via a bore formed through said piston leading to said space between the sleeve and the housing.

8. The valve according to claim 7, wherein said partition comprises an annular ring secured to said sleeve, which annular ring also has said piston fixed thereto.

9. An on/off valve for controlling the flow of a fluid between an inlet line and an outlet line to which said valve is to be connected, comprising:
   a housing including an annular partition dividing its interior into a first chamber, a second chamber, and an interconnecting passageway;
   a first port connectable to one of said lines and communicating with said first chamber;
   a second port connectable to the other of said lines and communicating with said second chamber;
   a piston fixed in said first chamber and to said annular partition;
   a cylinder disposed in said first chamber and movable with respect to said piston fixed in said first chamber;
   said cylinder including a closed end facing said first port and of substantially larger cross-sectional area than said first port;
   the space between said piston and cylinder being vented to the atmosphere;
   a resilient disc interposed between said first port and said closed end of the cylinder;
   the opposite end of the cylinder being opened and facing said partition;
   a plurality of abutments spaced circumferentially around said annular partition and engageable with the open end of said cylinder for maintaining same spaced from the annular partition and thereby continuously maintaining open said interconnecting passageway and the two chambers;
   and a spring interposed between said fixed piston and said movable cylinder urging the cylinder in the direction tending to close said first port.

10. The valve according to claim 9, wherein said resilient disc is of smaller diameter than said first port and is freely movable with respect thereto and said cylinder closed end for closing said first port, said first port constituting an inlet port and being connectable to the inlet line.

11. The valve according to claim 9, wherein said resilient disc is of smaller diameter than said first port and is secured to said closed cylinder end for closing said first port, said first port constituting either an inlet port connectable to the inlet line, or an outlet port connectable to the outlet line.

12. The valve according to claim 9, wherein said resilient disc is of annular shape having a smaller outer diameter than said first port and is freely movable with respect thereto and said cylinder closed end for closing said first port, said first port thereby constituting an inlet port connectable to the inlet line, or an outlet line connectable to the outlet line.

13. The valve according to claim 9, wherein the space between the piston and cylinder is vented to the atmosphere via a bore formed through the piston and the housing partition to the atmosphere.

14. A valve according to claim 9, wherein said piston includes a sleeve inserted into the housing and formed with a flat outer face defining a space between it and the inner face of the housing, the space between the piston and cylinder being vented to the atmosphere via a bore formed through said piston leading to said space between the sleeve and the housing.

* * * * *

UNITED STATES PATENT AND TRADEMARK OFFICE
CERTIFICATE OF CORRECTION

PATENT NO. : 4,678,004
DATED : July 7, 1987
INVENTOR(S) : Peretz Rosenberg

It is certified that error appears in the above-identified patent and that said Letters Patent is hereby corrected as shown below:

Column 5, line 53, change "smaller" to -- larger -- .

Column 5, line 59, change "smaller" to -- larger -- .

Column 5, line 65, change "smaller" to -- larger -- .

Column 6, line 60, change "smaller" to -- larger -- .

Column 6, line 66, change "smaller" to -- larger -- .

Column 7, line 4, change "smaller" to -- larger -- .

Signed and Sealed this

Seventh Day of March, 1989

Attest:

DONALD J. QUIGG

*Attesting Officer*  *Commissioner of Patents and Trademarks*